US011556115B2

(12) United States Patent
Zhang et al.

(10) Patent No.: US 11,556,115 B2
(45) Date of Patent: Jan. 17, 2023

(54) POINT VALUE CHANGE NOTIFICATION

(71) Applicants: Weilin Zhang, Charlotte, NC (US);
Weilun Huang, Charlotte, NC (US);
ZhenJun Mei, Charlotte, NC (US);
Felix Xiao, Charlotte, NC (US);
Yuxiang Li, Charlotte, NC (US); Qing
Jiang, Charlotte, NC (US);
HONEYWELL INTERNATIONAL
INC., Charlotte, NC (US)

(72) Inventors: Weilin Zhang, Charlotte, NC (US);
Weilun Huang, Charlotte, NC (US);
ZhenJun Mei, Charlotte, NC (US);
Felix Xiao, Charlotte, NC (US);
Yuxiang Li, Charlotte, NC (US); Qing
Jiang, Charlotte, NC (US)

(73) Assignee: Honeywell International Inc.,
Charlotte, NC (US)

(*) Notice: Subject to any disclaimer, the term of this patent is extended or adjusted under 35 U.S.C. 154(b) by 133 days.

(21) Appl. No.: 16/976,823

(22) PCT Filed: Mar. 2, 2018

(86) PCT No.: PCT/CN2018/077831
§ 371 (c)(1),
(2) Date: Aug. 31, 2020

(87) PCT Pub. No.: WO2019/165631
PCT Pub. Date: Sep. 6, 2019

(65) Prior Publication Data
US 2020/0409342 A1 Dec. 31, 2020

(51) Int. Cl.
G06F 3/01 (2006.01)
G05B 19/418 (2006.01)
(Continued)

(52) U.S. Cl.
CPC ......... *G05B 19/4185* (2013.01); *G06F 9/546* (2013.01); *H04L 67/562* (2022.05);
(Continued)

(58) Field of Classification Search
CPC ........ G05B 19/4185; G05B 2219/2614; G05B 2219/2642; G06F 9/546; G06F 9/542; H04L 67/2809; H04L 69/162
See application file for complete search history.

(56) References Cited

U.S. PATENT DOCUMENTS 9,612,585 B2 * 4/2017 Aggarwal ........... H04L 12/6418
2011/0125823 A1 5/2011 Macken
(Continued)

OTHER PUBLICATIONS

Pandarasamy Arjunan et al. ("SensorAct: A Decentralized and Scriptable Middleware for Smart Energy Buildings" (Year: 2015).*
(Continued)

*Primary Examiner* — Timothy A Mudrick
*Assistant Examiner* — Abdou K Seye
(74) *Attorney, Agent, or Firm* — Seager, Tufte & Wickhem, LLP

(57) ABSTRACT

Methods, devices, and systems for point value change notification are described herein. One system (100) includes a message broker (108) to receive data from a data acquisition (DAQ) system, a first building management system (BMS) instance (104) connected to the message broker (108) to process a first portion of the DAQ data, a second BMS instance (104) connected to the message broker (108) to process a second portion of the DAQ data, and a web application (118) connected to the message broker (108) to generate a notification of a change in point value of a portion of the first portion or the second portion of the DAQ data, where the first BMS instance (104) and the second BMS instance (104) are provisioned with a plurality of computing (Continued)

resources deployed in a computing environment (102, 502) and are ultimately executed on hardware.

17 Claims, 5 Drawing Sheets

(51) Int. Cl.
*H04L 69/16* (2022.01)
*G06F 9/54* (2006.01)
*H04L 67/562* (2022.01)

(52) U.S. Cl.
CPC .... *H04L 69/162* (2013.01); *G05B 2219/2614* (2013.01); *G05B 2219/2642* (2013.01)

(56) References Cited

U.S. PATENT DOCUMENTS

| | | |
|---|---|---|
| 2011/0125854 A1 | 5/2011 | Macken |
| 2012/0290230 A1* | 11/2012 | Berges Gonzalez ... G01D 4/004 |
| | | 702/61 |
| 2014/0155173 A1 | 6/2014 | Petersen et al. |
| 2014/0282470 A1 | 9/2014 | Buga et al. |
| 2014/0351371 A1 | 11/2014 | Smith et al. |
| 2018/0290230 A1* | 10/2018 | Kawashima ............ B29C 65/08 |
| 2019/0107831 A1* | 4/2019 | Duraisingh ........ G05B 23/0264 |

OTHER PUBLICATIONS

International Search Report of the International Searching Authority for PCT/CN2018/077831 dated Nov. 23, 2018.

\* cited by examiner

POINT VALUE CHANGE NOTIFICATION

The present application claims priority to PCT/CN2018/077831, filed on Mar. 2, 2018, entitled "POINT VALUE CHANGE NOTIFICATION", which is incorporated herein by reference.

TECHNICAL FIELD

The present disclosure relates to methods, devices, and systems for point value change notification.

BACKGROUND

Building automation systems can be complex distributed systems. For example, a building automation system can include many different pieces of equipment. As a specific example, a building automation system can include different pieces of heating, ventilation, and air-conditioning (HVAC) equipment as well as other equipment such as lighting, sensors, operating panels, controllers, actuators, etc.

A building management system can be an effective way to monitor building automation systems in buildings. For example, a user can monitor a buildings HVAC, lighting, sensors, operating panels, controllers, actuators, power, fire, security, and/or other systems and equipment. In some examples, the user can monitor the buildings systems and equipment from a single location via a user interface.

In an example in which a building management system monitors multiple buildings and/or sites, many data points may have to be processed in order to provide real time information regarding the buildings' systems and equipment. For example, data from multiple buildings' HVAC, lighting, sensors, operating panels, controllers, actuators, power, fire, security, and/or other systems and equipment may have to be processed such that real time information regarding these buildings' systems and equipment can be monitored.

DETAILED DESCRIPTION

Figure 1:
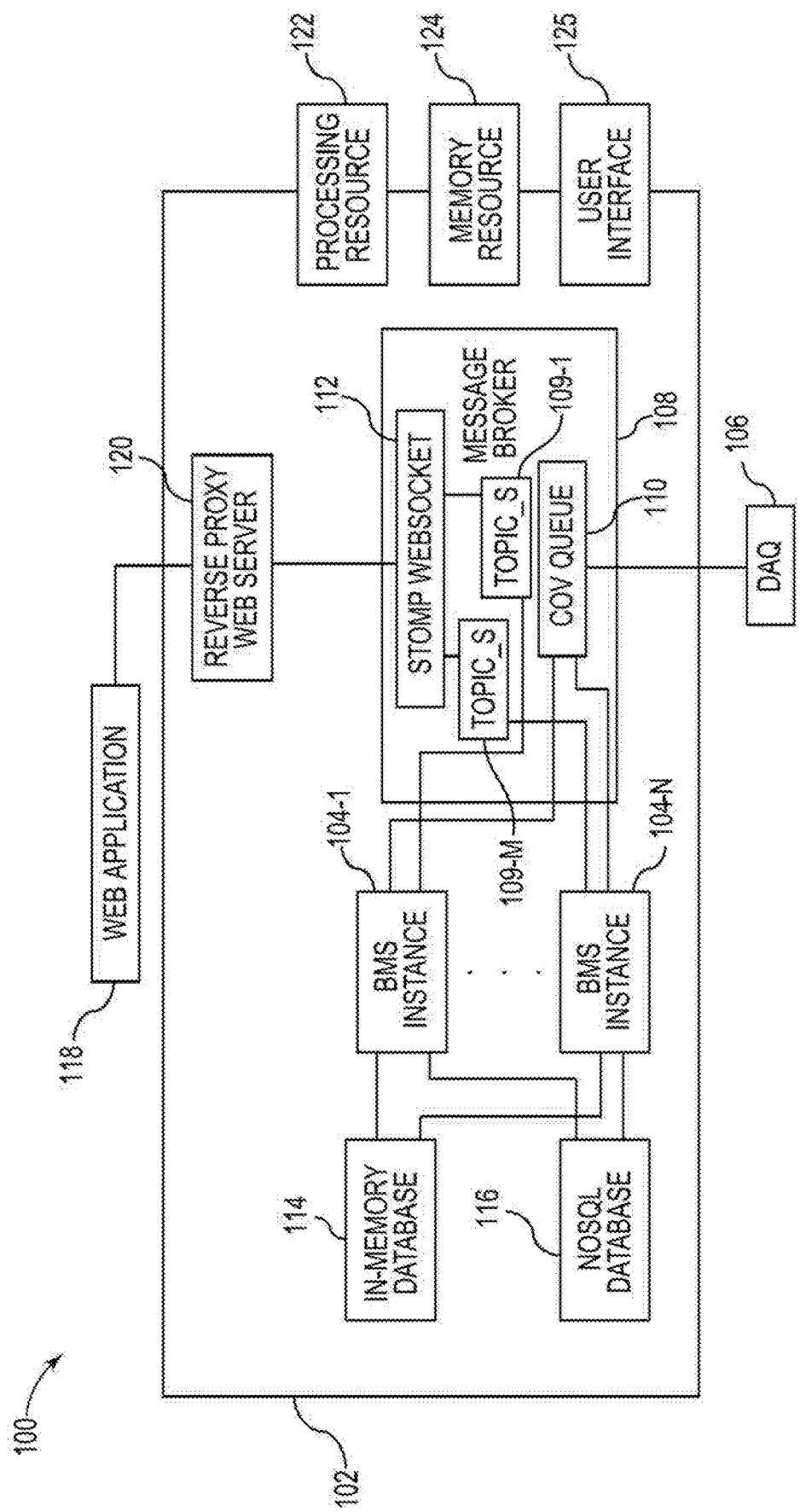
FIG. 1 is a system for point value change notification, generated in accordance with embodiments of the present disclosure.

Methods, devices, and systems for point value change notification are described herein. One system includes a message broker to receive data from a data acquisition (DAQ) system, a first building management system (BMS) instance connected to the message broker, where the first BMS instance is to execute instructions to process a first portion of DAQ data, and save the first portion of the processed DAQ data, a second BMS instance connected to the message broker, where the second BMS instance is to execute instructions to process a second portion of DAQ data, and save the second portion of the processed DAQ data, and a web application connected to the message broker to generate a notification of a change in point value of a portion of the first portion or the second portion of the DAQ data, where the first BMS instance and the second BMS instance are provisioned with a plurality of computing resources deployed in a computing environment and are ultimately executed on hardware.

In order to provide real time information regarding buildings' systems and equipment, data from buildings' HVAC, lighting, sensors, operating panels, controllers, actuators, power, fire, security, and/or other systems and equipment may be pushed to a web application for viewing by a user. As used herein, the term "user" can, for example, refer to a building operator, engineer, technician, maintenance personnel, and/or building owner, among other users. As used herein, the term "web application" can, for example, refer to a client-server computer program. For example, data from buildings systems and equipment may be pushed from a server to a client (e.g., the web application) so that a user can monitor real time information regarding buildings' systems and equipment.

In an example in which one building site is acquiring building systems and equipment data, the web application can connect to the server to receive the data and update values as data changes. However, in an example in which multiple building sites are acquiring building systems and equipment data, data from a first building site may not be received and updated by the web application when the web application is connected to a second building site. Therefore, a user may not see changes in data from building systems and equipment from the first building site. Additionally, saving historical data from multiple building sites may cause saving processes to run concurrently.

Point value change notification, in accordance with the present disclosure, can allow for a web application to receive and update data from multiple building sites concurrently. For example, a user can view data from a first building's systems and equipment and a second building's systems and equipment concurrently, in real time, via a web application.

As used herein, the term "building automation system" can, for example, refer to a system of equipment that can include central equipment and decentralized equipment. In some examples, the central equipment can include different plants such as boilers, chillers, air handling units (AHU's), rooftop units (RTU's), variable air volume (VAV) systems and control devices, and/or heat pumps, etc. In some examples, the decentralized equipment can include sensors, operating panels, controllers, actuators, fans, pumps, valves, coils, and/or radiators, etc.

Although sensors, operating panels, controllers, actuators, fans, pumps, valves, and/or radiators are described as being decentralized equipment, embodiments of the disclosure are not so limited. For example, sensors, operating panels, controllers, actuators, fans, pumps, valves, and/or radiators can be a part of and/or components of central equipment.

In the following detailed description, reference is made to the accompanying drawings that form a part hereof. The drawings show by way of illustration how embodiments of the disclosure may be practiced.

These embodiments are described in sufficient detail to enable those of ordinary skill in the art to practice embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 502 in FIG. 5.

FIG. 1 is a system 100 for point value change notification, generated in accordance with embodiments of the present disclosure. The system 100 can include a computing environment 102 with processing resources 122 (e.g., a number of processors), and memory resources 124. Computing environment 102 can extend virtualization concepts such as abstraction, pooling, and automation to computing resources and services. In computing environment 102, infrastructure, such as networking, processing, and security can be virtualized and delivered as a service. Computing environment 102 can include software defined networking and/or software defined storage. In some embodiments, components of computing environment 102 can be provisioned, operated, and/or managed through an application programming interface (API).

The computing environment 102 can execute a number of building management system (BMS) instances 104-1, ..., 104-N (referred to generally herein as "BMS instances 104"). The BMS instances can be provisioned with processing resources 122 and/or memory resources 124 and can communicate via a network interface. The processing resources 122 and the memory resources 124 provisioned to the BMS instances can be local and/or remote to the computing environment 102. For example, in computing environment 102, the BMS instances 104 can be provisioned with resources that are generally available to the computing environment 102 and are not tied to any particular hardware device. By way of example, the memory resources 124 can include volatile and/or non-volatile memory available to the BMS instances 104. The BMS instances 104 can be moved to different computing environments (not specifically illustrated in FIG. 1), such that a different computing environment can manage the BMS instances 104.

As illustrated in FIG. 1, the system 100 can include computing environment 102, web application 118, data acquisition (DAQ) system 106, processing resources 122, memory resources 124, and user interface 125. Computing environment 102 can include BMS instances 104, in-memory database 114, No search query language (NoSQL) database 116, reverse proxy web server 120, and message broker 108. Message broker 108 can include topics by site (e.g., topic_s) 109-1, 109-M (referred to collectively herein as topics_s 109), a change of value (COV) queue 110, and STOMP Websocket 112.

Computing environment 102 can include message broker 108. As used herein, the term "message broker" can, for example, refer to an intermediary program module that translates a message from a formal messaging protocol of a sender to a formal messaging protocol of a receiver. As used herein, the term "module" can, for example, refer to program instructions and/or hardware, but at least includes program instructions. For example, message broker 108 can receive a message from DAQ system 106 and translate the messaging protocol of that of DAQ system 106 to a messaging protocol of a BMS instance 104. In some examples, message broker 108 can be an ActiveMQ message broker, although embodiments of the present disclosure are not limited to an ActiveMQ message broker.

Message broker 108 can include COV queue 110. As used herein, the term "COV queue" can, for example, refer to a sequential collection of data. COV queue 110 can receive data from DAQ system 106. In other words, message broker 108 can receive data from DAQ system 106 via COV queue 110.

The data received by COV queue 110 from DAQ system 106 can be DAQ data. DAQ data can be data acquired by a data acquisition system. The DAQ data can be point values associated with measurements of components of a building and/or a plurality of buildings about building system and/or equipment. For example, DAQ data can include data point values associated with measurements of buildings HVAC, lighting, sensors, operating panels, controllers, actuators, power, fire, security, and/or other systems and equipment.

As described above, in some examples the DAQ data can include point values associated with HVAC components of a particular building, where the particular building may be one of a plurality of buildings. Point values associated with HVAC components may include a zone temperature of a particular space in the building, a fan speed of a particular fan of the building, a chiller temperature, a pump speed, etc. For example, COV queue 110 may receive DAQ data from DAQ system 106 including point values for a zone temperature of a particular office included in an office building.

In some examples the DAQ data can include point values associated with lighting components of a particular building, where the particular building may be one of a plurality of buildings. Point values associated with lighting components may include a lighting setting of a particular space in the building, occupancy sensor data of a particular space in the building, ambient light levels of a particular space in the building, etc. For example, COV queue 110 may receive DAQ data from DAQ system 106 including point values for a lighting setting of a particular office included in an office building.

The DAQ data received from DAQ system 106 can include data from different buildings. For example, a particular building management system may monitor data from a first building and a second building. The DAQ data received from DAQ system 106 can include HVAC, lighting, sensors, operating panels, controllers, actuators, power, fire, security, and/or other systems and equipment of the first building, and HVAC, lighting, sensors, operating panels, controllers, actuators, power, fire, security, and/or other systems and equipment of the second building.

Although the DAQ data from DAQ system 106 is described above as being received from two buildings, embodiments of the present disclosure are not so limited. For example, the DAQ data can be received from one building, two buildings, and/or more than two buildings.

The DAQ data received from DAQ system 106 can include data sampled at different frequencies. For example, particular point values of data may be sampled at different frequencies than other point values. For instance, a zone temperature of a particular space of a building may be sampled every five minutes, whereas a lighting intensity level may be sampled every ten minutes.

Although the sampling frequencies of various point value of DAQ data are described above as being every five minutes and/or every ten minutes, embodiments of the present disclosure are not so limited. For example, various pint values of DAQ data may be sampled less than every five minutes (e.g., every one minute, every thirty seconds, etc.) and/or more than every five minutes (e.g., every seven minutes, every ten minutes, every thirty minutes, every hour, etc.)

As described above, the DAQ data received from DAQ system 106 can include point values. Each point value can include a topic, a site identifier (ID) that corresponds to a building where the point value was sampled, and/or a sample frequency. For example, a point value can include a topic a temperature setting of a particular room of a building, a site ID corresponding to the building the temperature was sampled, and a sampling frequency such as every five minutes.

Message broker 108 can include a communications protocol. As used herein, the term "communications protocol" can, for example, refer to a system of rules that allow two or more entities of a communications system to transmit information. The communications protocol of message broker 108 can define a rules syntax, semantics and synchronization of communication, and/or error recovery methods, and may be implemented by hardware, software, and/or a combination thereof. For example, the communications protocol of message broker 108 can define a system of rules for communication between message broker 108 and another entity, for example, web application 118.

The communications protocol of message broker 108 can be a simple (or streaming) text-oriented message protocol (STOMP). As used herein, the term "STOMP" can, for example, refer to a text-based communications protocol. STOMP can be utilized with WebSocket. As used herein, the term "WebSocket" can, for example, refer to a computer communications protocol providing full-duplex communication channels over a transmission control protocol (TCP) connection. For example, STOMP WebSocket 112 can define a communications protocol between message broker 108 and web application 118. Web application 118 and message broker 108 can communicate via STOMP WebSocket 112, as is further described herein.

The computing environment 102 can include a plurality of BMS instances 104. For example, computing environment 102 can include BMS instance 104-1 and BMS instance 104-N. As described above, the plurality of BMS instances 104 can be provisioned with computing resources and deployed in computing environment 102, where the computing resources provisioned to the plurality of BMS instances 104 can be executed on hardware, such as processing resources 122 and memory resources 124. The computing environment 102 can be a single physical computing device or multiple physical computing devices. In other words, the plurality of BMS instances 104 can be deployed in a single physical computing device or over multiple physical computing devices.

BMS instances 104 can execute instructions to process a particular portion of the DAQ data received from DAQ system 106. For example, message broker 108 can receive DAQ data from DAQ system 106 at COV queue 110. A BMS instance, such as BMS instance 104-1 can process a particular portion of the DAQ data.

Processing a particular portion of DAQ data can include filtering point values of the portion of DAQ data into topics and/or by site. Topics can include a type of data point associated with a particular measurement. For example, topics can include measurements of buildings HVAC, lighting, sensors, operating panels, controllers, actuators, power, fire, security, and/or other systems and equipment. In some examples, BMS instance 104-1 can filter point values based on HVAC measurements (e.g., measurements of a temperature setting, measurements of a fan speed, measurements of a chiller temperature, measurements of a pump speed, etc.), lighting measurements (e.g., measurements of lighting settings, measurements of ambient light level, etc.), measurements of sensors, etc.

Processing a particular portion of DAQ data can include filtering point values of the portion of DAQ data by site. For example, as described above, data points of the DAQ data can include a site ID. DAQ data may come from multiple buildings. In some examples, BMS instance 104-1 can filter point values based on DAQ data coming from a first building, additional DAQ data from a second building, etc. For example, as illustrated in FIG. 1, BMS instances 104 can filter point values based on topic and site. For instance, BMS instance 104-1 can filter point values based on HVAC measurements from a first building. Filtering the values by site can result in topic_s 109-1 being HVAC measurements from a first building.

BMS instances 104 can execute instructions to save the particular portion of the DAQ data to an in-memory database 114. As used herein, the term "in-memory database" can, for example, refer to a database relying on main memory, such as memory accessible by a central processing unit (CPU) for computer data storage. In some examples, in-memory database 114 can be a Redis database, although embodiments of the present disclosure are not limited to a Redis in-memory database.

Saving the portion of DAQ data to in-memory database 114 can include configuring data point history frequency, synchronizing point information to a server, and saving point history based on different point history frequencies, as is further described in connection with FIG. 2. The point history can be saved to NoSQL database 116. As used herein, the term "NoSQL database" can, for example, refer to a database for storage and retrieval of data that is modeled in terms other than tabular relations. In some examples, NoSQL database 116 can be a Cassandra database, although embodiments of the present disclosure are not limited to a Cassandra NoSQL database.

Web application 118 can subscribe (e.g., connect) to message broker 108 via STOMP WebSocket 112 to generate a notification in response to a change in point value of a portion of DAQ data, as is further described herein. For example, a change in point value of a portion of DAQ data received from DAQ system 106 can be processed and communicated to web application 118, allowing web application 118 to update a value of the DAQ data such that the value of the DAQ data can be displayed to a user on user interface 125. For instance, a point value included in DAQ data can correspond to a zone temperature measurement of a space in a building of 71° F. The point value of the zone temperature measurement may change to be 72° F., measured by a temperature sensor in the space of the building. The point value having the updated zone temperature measurement may be processed and communicated to web application 118 so that the updated zone temperature measurement may be displayed to a user via user interface 125.

Web application 118 can be connected to message broker 108 via a reverse proxy web server 120. As used herein, the term "reverse proxy web server" can, for example, refer to a proxy server that retrieves resources on behalf of a client. For example, reverse proxy web server 120 can serve as an intermediary proxy server between web application 118 and in-memory database 114. For instance, reverse proxy web server 120 can proxy a request from web application 118 to STOMP WebSocket 112 to retrieve processed DAQ data from in-memory database 114. The retrieved processed DAQ data can be retrieved by STOMP WebSocket 112 and transmitted to web application 118, where the retrieved processed DAQ data can be viewed by a user via user interface 125. For instance, continuing with the example from above, STOMP WebSocket 112 can retrieve processed DAQ data corresponding to the zone temperature measurement of 72° F. based on a request from web application 118 that is proxied to STOMP WebSocket 112 via reverse proxy web server 120, and transmit the processed DAQ data corresponding to the zone temperature measurement of 72° F. to web application 118 so that a user can see that the zone temperature measurement of the particular space has changed from 71° F. to 72° F.

Computing environment 102 can include user interface 125. The web application 118 and corresponding content, such as information regarding buildings' systems and equipment, can be viewed by a user via the user interface 125 of the computing environment 102. In other words, the user interface 125 can display the change in point value.

Figure 2:
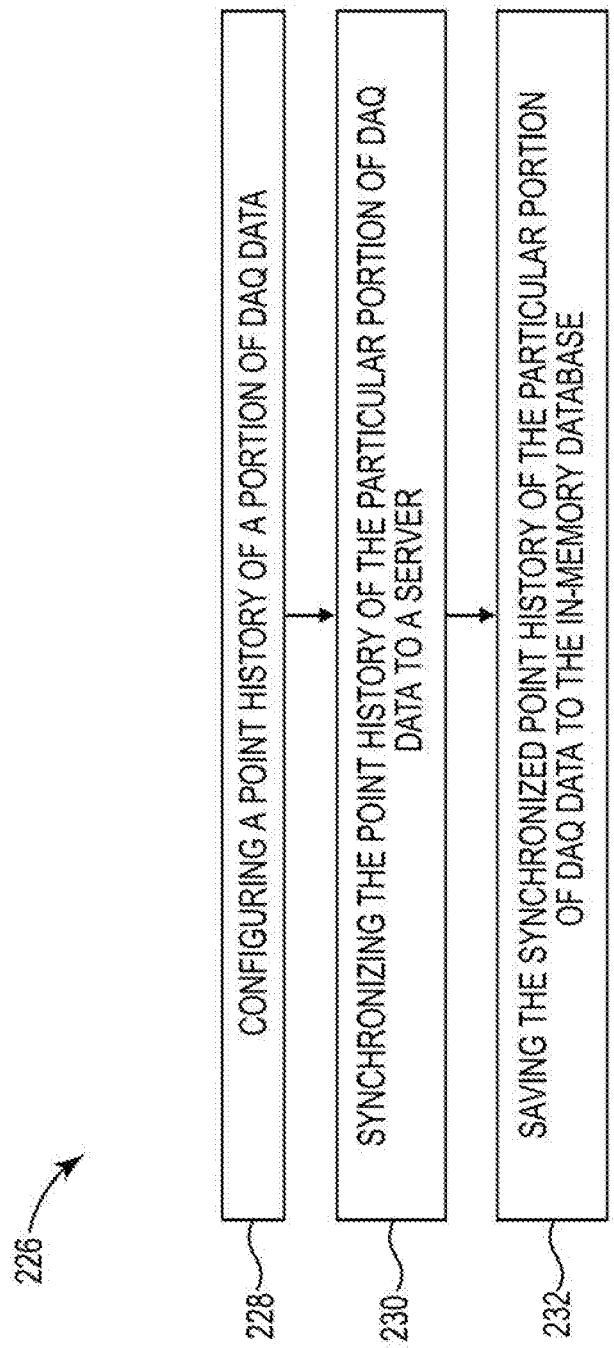
FIG. 2 is a flow chart of a method for saving a particular portion of DAQ data to an in-memory database, in accordance with embodiments of the present disclosure.

FIG. 2 is a flow chart of a method 226 for saving a particular portion of DAQ data to an in-memory database, in accordance with embodiments of the present disclosure. Method 226 may be performed by, for example, a BMS instance (e.g., BMS instances 104, previously described in connection with FIG. 1) located in a computing environment (e.g., computing environment 102, previously described in connection with FIG. 1).

At 228, the method 226 can include configuring a point history of a portion of DAQ data. The DAQ data can include data having point history frequencies that may be different. The BMS instance can configure the point history frequency by setting the point history frequency to a specified frequency. For example, DAQ data having a point history frequency of one minute can be configured to have a point history frequency of one minute.

Although described above as having a specified frequency of one minute, embodiments of the present disclosure are not so limited. For example, the specified frequency can be any other frequency. For instance, the specified frequency can be less than one minute (e.g., thirty seconds, ten seconds, etc.) and/or more than one minute (e.g., five minutes, ten minutes, thirty minutes, one hour, one day, etc.)

At 230, the method 226 can include synchronizing the point history of the particular portion of DAQ data to the in-memory database. Synchronizing the particular portion of the DAQ data to the in-memory database can include passing, by the BMS instance, a site ID and data point values of the DAQ data to the in-memory database using a configuration tool.

Once the site ID and data point values of the DAQ data are passed to the in-memory database, the DAQ data can be grouped by site ID and frequency. For example, the DAQ data can be grouped as such: "siteid_frequency". For instance, the in-memory database key can consistent of grouped points by site ID and frequency such as 1_One-Minute, values: [1, 4, 10, 30, 60, 1000, 1005]; 1_Five-Minute, values: [9, 20, 80, 90, 10000, 10008]; etc.

At 232, the method 226 can include saving the synchronized point history of the particular portion of DAQ data to the in-memory database. For example, the BMS instance can save the synchronized point history of DAQ data to the Redis in-memory database.

Saving the synchronized point history to the in-memory database can include traversing, by the BMS instance, the synchronized point history of each portion of the DAQ data. For example, the BMS instance can traverse each data point of the DAQ data.

While the BMS instance traverses each data point of the DAQ data, the BMS instance can retrieve the point value of each data point. For example, the BMS instance can retrieve the point value of each data point of the DAQ data from the in-memory database, such as each zone temperature value of a particular space, each lighting setting value of a particular space, etc. The BMS instance can group the points by frequency. For example, the BMS instance can utilize a format such as "<frequency,[<siteID, [points]]>]>". For instance, the BMS instance can take a particular data point (e.g., <OneMinute,[<1,[1, 4, 10, 30, 60, 1000, 1005]>]) and group other data points by frequency (e.g., one minute, five minutes, etc.)

The BMS instance can save the obtained values into a NoSQL database. For example, the BMS instance can save the obtained values (e.g., <OneMinute,[<1,[1, 4, 10, 30, 60, 1000, 1005]>]) and save the obtained and grouped values into a Cassandra NoSQL database.

As described in connection with FIG. 1, the computing environment can include multiple BMS instances. Accordingly, multiple BMS instances may be saving synchronized point histories of a particular portion of DAQ data to the in-memory database at the same time. Therefore, the in-memory database can verify that at least one BMS instance successfully saved a point history of the particular portion of DAQ data, as is further described herein.

The in-memory database can verify a saved point history by traversing the synchronized point history of the particular portion of the DAQ data. For example, the in-memory database can retrieve the point value of each data point of the DAQ data.

The in-memory database can group the synchronized point history by site ID and sample frequency. For example, point history can be grouped by site ID (e.g., building one, building two, etc.) and by sample frequency (e.g., one minute, five minutes, etc.)

The in-memory database can lock a resource lock of the in-memory database. In response to the resource lock of the in-memory database being acquired, the in-memory database can then determine whether the synchronized point history from a particular BMS instance of the multiple BMS instances has been saved. If the synchronized point history has been saved, the synchronizing the DAQ data saving operation for the multiple BMS instances can end.

In an example in which the synchronized point history has not been saved, the in-memory database can retrieve the point value of each data point of the particular portion of the DAQ data. For example, the in-memory database can retrieve the point value of each data point of the DAQ data, such as each zone temperature value of a particular space, each lighting setting value of a particular space, etc.

The in-memory database can save the point value of each data point of the particular portion of the DAQ data into the NoSQL database. For example, based on the synchronized point history not having been saved, the in-memory database can save the point value of each data point of the DAQ data to a Cassandra NoSQL database, including point values for each zone temperature value of a particular space, each lighting setting value of a particular space, etc.

The in-memory database can set a point history flag in the in-memory database. Following setting of the point history flag, the in-memory database can release the resource lock.

Figure 3:
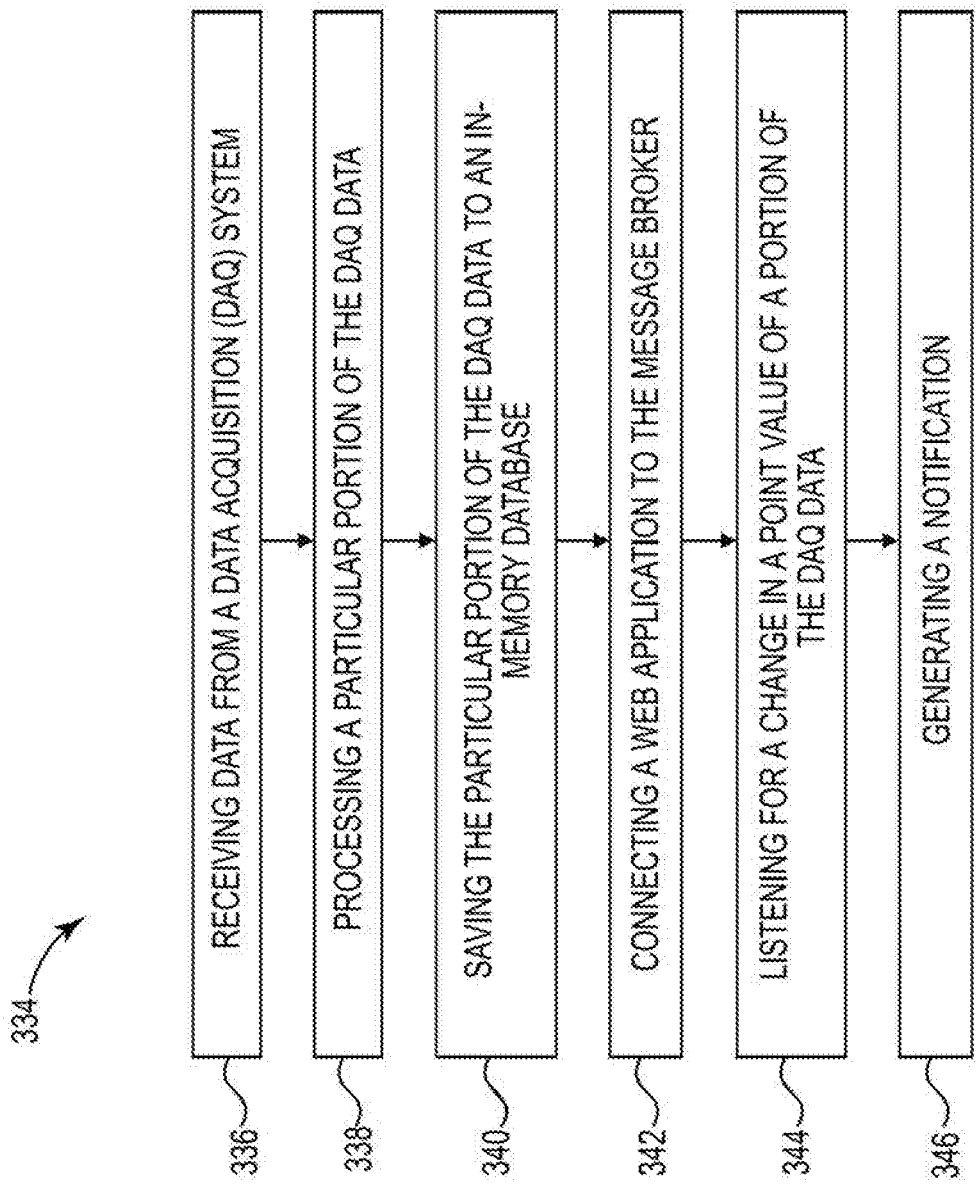
FIG. 3 is a flow chart of a method for notification of a change in point value, in accordance with embodiments of the present disclosure.

FIG. 3 is a flow chart of a method 334 for notification of a change in point value, in accordance with embodiments of the present disclosure. Method 334 may be performed by, for example, a system (e.g., system 100, previously described in connection with FIG. 1) including a computing environment (e.g., computing environment 102, previously described in connection with FIG. 1) with processing resources (e.g., processing resources 122, previously described in connection with FIG. 1) and memory resources (e.g., memory resources 124, previously described in connection with FIG. 1), a web application (e.g., web application 118, previously described in connection with FIG. 1), and a DAQ system (e.g., DAQ system 106, previously described in connection with FIG. 1). The computing environment can include BMS instances (e.g., BMS instances 104, previously described in connection with FIG. 1), in-memory database (e.g., in-memory database 114, previously described in connection with FIG. 1), a NoSQL database (e.g., NoSQL database 116, previously described in connection with FIG. 1), a reverse proxy web server (e.g., reverse proxy web server 120, previously described in connection with FIG. 1), and a message broker (e.g., message broker 108, previously described in connection with FIG. 1). The message broker can include a COV queue (e.g., COV queue 110, previously described in connection with FIG. 1), and a STOMP Websocket (e.g., STOMP Websocket 112, previously described in connection with FIG. 1).

At 336, the method 334 includes receiving data from a DAQ system. For example, the COV queue of included in the message broker can receive DAQ data from a DAQ system. As previously described in connection with FIG. 1, the DAQ data received from the DAQ system can include HVAC, lighting, sensors, operating panels, controllers, actuators, power, fire, security, and/or other systems and equipment of a first building, and/or HVAC, lighting, sensors, operating panels, controllers, actuators, power, fire, security, and/or other systems and equipment of a second building, etc.

At 338, the method 334 includes processing a particular portion of the DAQ data. For example, a BMS instance, or in some examples, multiple BMS instances, may process a particular portion of the DAQ data. Each BMS instance can be provisioned with computing resources deployed in the computing environment and executed by hardware. Utilizing the computing resources, each BMS instance can process a respective portion of the DAQ data.

At 340, the method 334 includes saving the particular portion of the DAQ data to an in-memory database. For example, a BMS instance can save a particular portion of DAQ data to an in-memory database by configuring a point history of the particular portion of the DAQ data, synchronizing the point history of the particular portion of the DAQ data, and saving the synchronized point history of the particular portion of the DAQ data to the in-memory database.

For example, the BMS instance can configure the point history by setting the point history frequency to a specified frequency. For example, DAQ data having a point history frequency of one minute can be configured to have a point history frequency of one minute.

In some examples, synchronizing the point history of the particular portion of the DAQ data can include passing, by the BMS instance, a site ID and point values of the DAQ data to the in-memory database using a configuration tool and passing DAQ data grouped by site ID and data point values to the in-memory database.

In some examples, saving the synchronized point history to the in-memory database can include traversing the synchronized point history of the portion of the DAQ data by the BMS instance and retrieving the point value of each data point. The BMS instance can save the obtained point values of each data point into a NoSQL database. The DAQ data can be stored in the in-memory database until retrieved for the web application, as is further described herein.

At 342, the method 334 can include connecting a web application to the message broker. For example, the web application can connect to the message broker via a STOMP WebSocket communications protocol included with the message broker, as is further described in connection with FIG. 4.

At 344, the method 334 can include listening for a change in a point value of a portion of the DAQ data. For example, the web application can listen for a change in point value of the DAQ data. For instance, the web application may be subscribed to zone temperature readings of a particular space of a first building and a lighting setting of a particular space of a second building. The web application can listen for any changes in the zone temperature values or the lighting setting values of the first and the second buildings, respectively.

At 346, the method 334 can include generating a notification. For example, the web application can generate, in response to a change in point value, a notification. For example, continuing with the example above, the web application can be subscribed to zone temperature readings of an office in a first building, where the zone temperature is 70° F. The DAQ data may be received by the message broker indicating the zone temperature has increased to 71° F., processed by a BMS instance, and stored in the in-memory database, where the web application can then generate a notification in response to the change in point value.

The web application can cause the notification to be displayed on a user interface of a computing environment. For example, the notification can be displayed on a user interface of a computing environment so that a user may be notified that a zone temperature change has occurred in the particular office of the building the web application is subscribed to.

Figure 4:
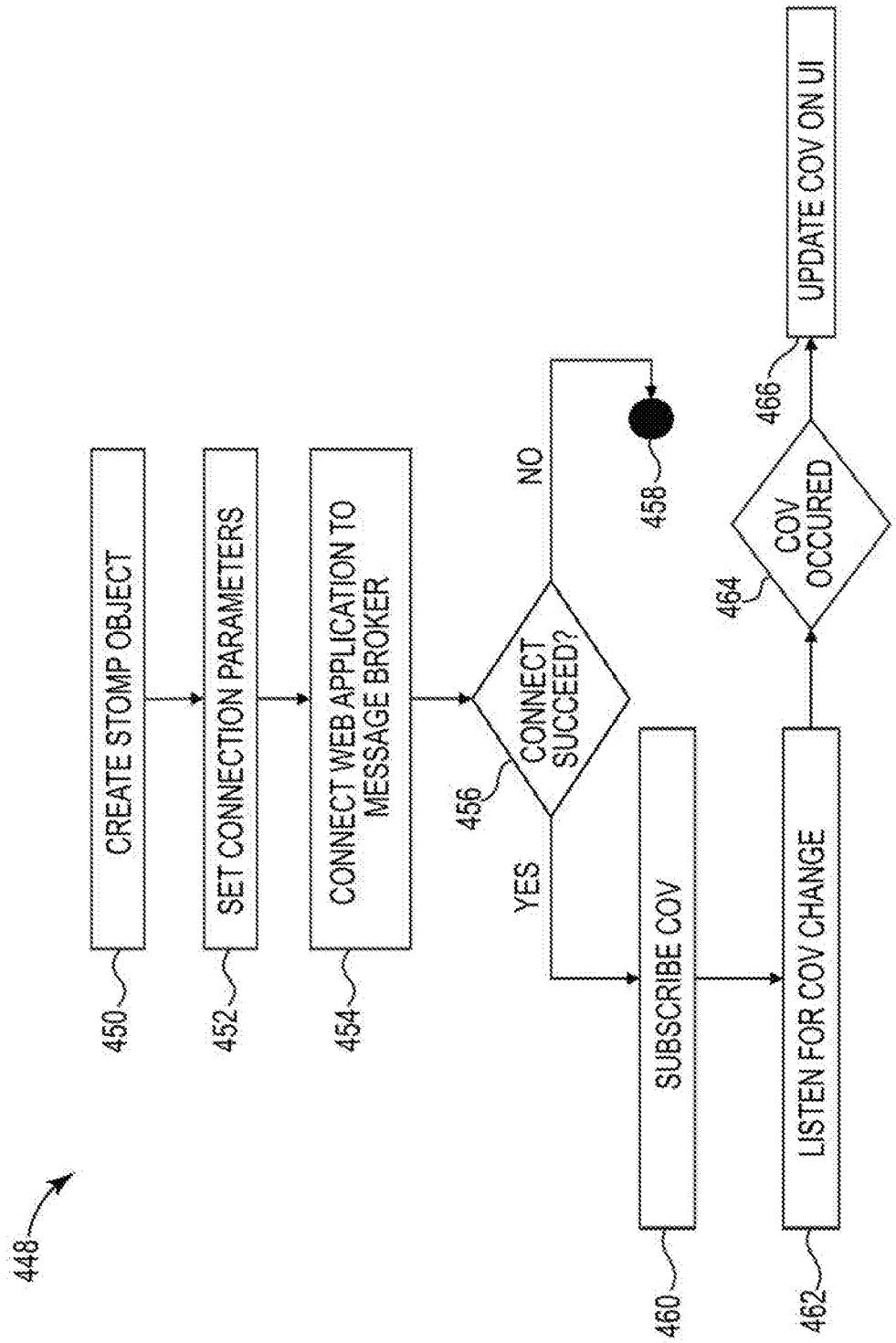
FIG. 4 is a flow chart of a method for connecting a web application to a message broker and updating a COV, in accordance with embodiments of the present disclosure.

FIG. 4 is a flow chart of a method 448 for connecting a web application to a message broker and updating a COV, in accordance with embodiments of the present disclosure. Method 448 may be performed by, for example, a system (e.g., system 100, previously described in connection with FIG. 1) including a computing environment (e.g., computing environment 102, previously described in connection with FIG. 1) with processing resources (e.g., processing resources 122, previously described in connection with FIG. 1) and memory resources (e.g., memory resources 124, previously described in connection with FIG. 1), a web application (e.g., web application 118, previously described in connection with FIG. 1), and a DAQ system (e.g., DAQ system 106, previously described in connection with FIG. 1). The computing environment can include BMS instances (e.g., BMS instances 104, previously described in connection with FIG. 1), in-memory database (e.g., in-memory database 114, previously described in connection with FIG. 1), a NoSQL database (e.g., NoSQL database 116, previously described in connection with FIG. 1), a reverse proxy web server (e.g., reverse proxy web server 120, previously described in connection with FIG. 1), and a message broker (e.g., message broker 108, previously described in connection with FIG. 1). The message broker can include a COV queue (e.g., COV queue 110, previously described in connection with FIG. 1), and a STOMP Websocket (e.g., STOMP Websocket 112, previously described in connection with FIG. 1).

At 450, the method 448 can include creating a STOMP object. For example, the web application can create a STOMP object in preparation for connecting with the message broker.

At 452, the method 448 can include setting connection parameters. For example, the web application can set connection parameters between the web application and the message broker. Connection parameters can include a uniform resource locator (URL), time-out settings, etc.

At 454, the method 448 can include connecting to the message broker by the web application. For example, the web application can attempt to connect to the message broker utilizing the STOMP object and the connection parameters.

At 456, the method 448 can include determining, by the web application, whether the connection to the message broker was successful. If not, the connection process ends at 458. If so, at 460, the web application can subscribe to a COV. For example, the web application can subscribe to any changes in point value of DAQ data describing zone temperature readings of a particular space of a first building and a lighting setting of a particular space of a second building. At 462, the method 448 can include listening, by the web application, for any COV changes.

At 464, the method 448 can include a COV having occurred. For example, a change in the zone temperature of the particular space of the first building may have occurred (e.g., the temperature of the space rose from 70° F. to 71° F.). At 466, the method 448 can include updating the COV on a user interface. For example, the change in zone temperature can be displayed on a user interface of a display so that the user can be notified of the change in temperature of the space in the first building.

Point value change notification, according to embodiments of the present disclosure, can allow for real-time value notification based on multiple sites in a BMS environment. Synchronizing various BMS instances can be occurred so that resources of a computing environment can be used efficiently. Further, changes in value of point values of DAQ data can be displayed to a user without losing COV notifications from a site to which the web application is not connected.

Figure 5:
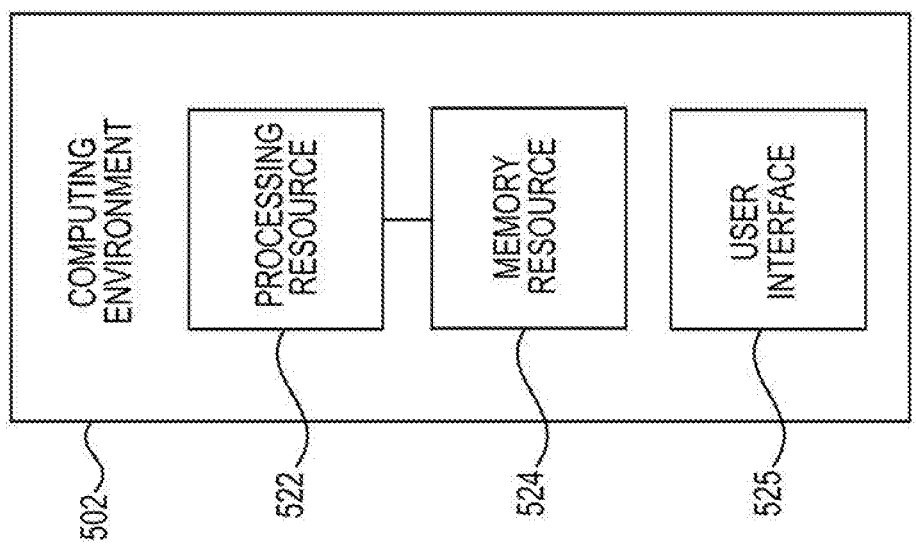
FIG. 5 is a computing environment for point value change notification, in accordance with embodiments of the present disclosure.

FIG. 5 is a computing environment 502 for point value change notification, in accordance with embodiments of the present disclosure. As illustrated in FIG. 5, computing environment 502 can include processing resources 522 and memory resources 524 for point value change notification in accordance with the present disclosure.

The computing environment 502 can be a combination of hardware and program instructions configured to perform a number of functions (e.g., actions). The hardware, for example, can include a number of processing resources 522 and a number of memory resources 524, such as a machine-readable medium (MRM) or other memory resources 524. The memory resources 524 can be internal and/or external to the computing environment 502 (e.g., the computing environment 502 can include internal memory resources and have access to external memory resources). The program instructions (e.g., machine-readable instructions (MRI)) can include instructions stored on the MRM to implement a particular function (e.g., an action such as point value change notification). The set of MRI can be executable by one or more of the processing resources 522. The memory resources 524 can be coupled to the computing environment 502 in a wired and/or wireless manner. For example, the memory resources 524 can be an internal memory, a portable memory, a portable disk, and/or a memory associated with another resource, e.g., enabling MRI to be transferred and/or executed across a network such as the Internet.

Memory resources 524 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 522 can be coupled to the memory resources 524 via a communication path. The communication path can be local or remote to the computing environment 502. Examples of a local communication path can include an electronic bus internal to a machine, where the memory resources 524 are in communication with the processing resources 522 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path can be such that the memory resources 524 are remote from the processing resources 522, such as in a network connection between the memory resources 524 and the processing resources 522. That is, the communication path can be a network connection. Examples of such a network connection can include a local area network (LAN), wide area network (WAN), personal area network (PAN), and the Internet, among others.

As illustrated in FIG. 5, computing environment 502 includes a user interface 525. For example, the user interface 525 can display a point value change notification (e.g., as previously described in connection with FIGS. 1-4) in a display, as previously described in connection with FIGS. 1-4. A user (e.g., operator) of computing environment 502 can interact with computing environment 502 via user interface 525. For example, user interface 525 can provide (e.g., display and/or present) information to the user of computing environment 502, and/or receive information from (e.g., input by) the user of computing environment 502. For instance, in some embodiments, user interface 525 can be a graphical user interface (GUI) that can provide and/or receive information to and/or from the user of computing environment 502. The display can be, for instance, a touch-screen (e.g., the GUI can include touch-screen capabilities). Alternatively, a display can include a television, computer monitor, mobile device screen, other type of display device, or any combination thereof, connected to computing environment 502 and configured to receive a video signal output from the computing environment 502.

As an additional example, user interface 525 can include a keyboard and/or mouse the user can use to input information into computing environment 502. Embodiments of the present disclosure, however, are not limited to a particular type(s) of user interface.

User interface 525 can be localized to any language. For example, user interface 525 can display the point value change notification in any language, such as English, Spanish, German, French, Mandarin, Arabic, Japanese, Chinese, Hindi, etc.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system (100), comprising:
    a message broker (108) operatively coupled to a data acquisition (DAQ) system, the message broker receiving data including point values from the data acquisition (DAQ) system (106), wherein at least some of the point values include a site identifier and a sample frequency;
    a first building management system (BMS) instance (104) connected to the message broker (108), wherein the first BMS instance (104) executes instructions to:
        process a first portion of the DAQ data including configuring a point history of the first portion of the DAQ data, synchronizing the point history of the first portion of the DAQ data to a server, and saving the point history of the first portion of the DAQ data to a database, wherein saving the point history of the first portion of the DAQ data to the database includes:
            locking a resource lock of the database;
            traversing the point history of the first portion of the DAQ data;
            grouping the point history of the first portion of the DAQ data by the site identifier and the sample frequency; and
            determining whether the point history of the first portion of the DAQ data has been saved to the database, and if so, releasing the resource lock; and
    a second BMS instance (104) connected to the message broker (108), wherein the second BMS instance (104) executes instructions to:
        process a second portion of the DAQ data, wherein the second portion of the DAQ data is different from the first portion of the DAQ data, wherein processing the second portion of the DAQ data includes configuring a point history of the second portion of the DAQ data, synchronizing the point history of the second portion of the DAQ data to a server, and saving the point history of the second portion of the DAQ data to the database, wherein saving the point history of the second portion of the DAQ data to the database includes:
            locking the resource lock of the database;
            traversing the point history of the second portion of the DAQ data;
            grouping the point history of the second portion of the DAQ data by the site identifier and the sample frequency; and
            determining whether the point history of the second portion of the DAQ data has been saved to the database, and if so, releasing the resource lock; and
    a web application (118) connected to the message broker (108), the web application generating a notification of a change in point value of a portion of the first portion or the second portion of the DAQ data;
    wherein the first BMS instance (104) and the second BMS instance (104) are each virtually provisioned with a plurality of computing resources that are available in a computing environment (102, 502), and are ultimately executed on hardware.

2. The system (100) of claim 1, wherein the message broker (108) includes a communications protocol to connect the web application (118) to the message broker (108).

3. The system (100) of claim 2, wherein:
    the communications protocol is a streaming text-oriented message protocol (STOMP) WebSocket (112) communications protocol; and
    the web application (118) subscribes to the message broker (108) via the STOMP WebSocket (112) protocol to generate the notification in response to the change in point value of the portion of the first portion or the second portion of the DAQ data.

4. The system (100) of claim 1, wherein:
    the message broker (108) includes a change of value (COV) queue (110); and
    the message broker (108) receives the DAQ data from the DAQ system (106) via the COV queue (110).

5. The system (100) of claim 4, wherein the first BMS instance (104) and the second BMS instance (104) are configured to execute instructions to process the first portion and the second portion of the DAQ data in the COV queue (110) by filtering the first portion and the second portion of the DAQ data in the COV queue (110) by topic and site identifier (ID).

6. The system (100) of claim 1, wherein the DAQ data includes data from different buildings and sampled at different frequencies.

7. The system (100) of claim 1, wherein the DAQ data includes point values, and wherein each point value includes a topic, a site identifier (ID) that corresponds to a building where the point value was sampled, and a sample frequency.

8. The system (100) of claim 1, wherein the DAQ data includes point values associated with measurements of components of a plurality of buildings.

9. The system of claim 1, wherein the DAQ data includes point values associated with at least one of:
    a heating, ventilation, and air conditioning (HVAC) components of a particular building of the plurality of buildings; and lighting components of a particular building of the plurality of buildings.

10. A system, comprising:
a message broker including a change of value (COV) queue, wherein the COV queue receives DAQ data including point values from a data acquisition (DAQ) system, wherein at least some of the point values include a site identifier and/or a sample frequency;
a plurality of building management system (BMS) instances operatively connected to the message broker, wherein the plurality of BMS instances are each virtually provisioned with a plurality of computing resources that are available in a computing environment and are ultimately executed on hardware, wherein each particular BMS instance of the plurality of BMS instances executes instructions to:
process a respective portion of the DAQ data including configuring a point history of the respective portion of the DAQ data and synchronizing the point history of the respective portion of the DAQ data to a server; and
save the point history of the respective portion of the DAQ data to a database, including:
locking a resource lock of the database;
traversing the point history of the respective portion of the DAQ data;
grouping the point history of the respective portion of the DAQ data by the site identifier and/or the sample frequency; and
determining whether the point history of the respective portion of the DAQ data has been saved to the database, and if so, releasing the lock resource;
a web application connected to the message broker via a streaming text-oriented message protocol (STOMP) WebSocket communications protocol included with the message broker and generates a notification of a change in point value of the DAQ data; and
a computing device including a user interface, the computing device displays the notification of the change in point value via a display.

11. The system of claim 10, wherein the instructions to configure the point history include instructions to configure a sample frequency of the point history of each respective portion of the DAQ data.

12. The system of claim 10, wherein the database is a no structured query language (NoSQL) database.

13. The system of claim 10, wherein the web application is connected to the message broker via a reverse proxy web server.

14. A method for notification of a change in point value, comprising:
receiving, via a change of value (COV) queue included in a message broker, data including point values from a data acquisition (DAQ) system, wherein at least some of the point values include a site identifier and a sample frequency;
processing, via a respective building management system (BMS) instance of a plurality of BMS instances each virtually provisioned with a plurality of computing resources that are available in a computing environment and executed by hardware, a respective portion of the DAQ data, including:
configuring a point history of the respective portion of the DAQ data;
synchronizing the point history of the respective portion of the DAQ data to a server; and
saving the point history of the respective portion of the DAQ data to an in-memory database, including:
locking a resource lock of the in-memory database;
traversing the point history of the respective portion of the DAQ data;
grouping the point history of the respective portion of the DAQ data by the site identifier and the sample frequency; and
determining whether the point history of the respective portion of the DAQ data has been saved to the in-memory database, and if so, releasing the resource lock;
connecting, via a streaming text-oriented message protocol (STOMP) WebSocket communications protocol included with the message broker, a web application to the message broker;
listening, by the web application, for a change in a point value of a portion of the DAQ data;
generating, by the web application in response to a change in point value, a notification; and
displaying, on a user interface of a computing device, the notification of the change in point value via a display.

15. The method of claim 14, wherein connecting the web application to the message broker includes:
creating, by the web application, a STOMP object;
setting, by the web application, connection parameters between the web application and the message broker; and
connecting, based on the STOMP object and the connection parameters, the web application to the message broker.

16. The method of claim 15, wherein setting the connection parameters includes setting, by the web application, a uniform resource locator (URL) and a time-out parameter.

17. The method of claim 14, wherein the method includes:
in response to determining that the point history of the respective portion of the DAQ data has not yet been saved to the in-memory database:
retrieving, by the in-memory database, the point value of each data point of the respective portion of the DAQ data;
saving, by the in-memory database, the point value of each data point of the respective portion of the DAQ data into a no structured query language (NoSQL) database;
setting, by the in-memory database, a point history flag in the in-memory database; and
releasing, by the in-memory database, the resource lock.

* * * * *